United States Patent
Yokoyama

[11] 3,880,036
[45] Apr. 29, 1975

[54] AUTOMATIC LUMBERING APPARATUS
[75] Inventor: Yosihei Yokoyama, Shimada, Japan
[73] Assignee: Yokoyama Tekko Kabushiki Kaisha, Shimada-shi, Japan
[22] Filed: Nov. 14, 1973
[21] Appl. No.: 415,624

[52] U.S. Cl. .................. 83/421; 83/422; 83/425; 83/436; 144/246 B
[51] Int. Cl. ............................................ B27b 13/10
[58] Field of Search .................. 83/421–422, 83/436, 425; 144/246 B

[56] References Cited
UNITED STATES PATENTS
1,965,351  7/1934  Munroe .................. 83/436 X
3,738,403  6/1973  Schwoch ................ 83/418 X

*Primary Examiner*—J. M. Meister
*Attorney, Agent, or Firm*—Basile and Weintraub

[57] ABSTRACT

Automatic lumbering apparatus for sawing lumber into columns, boards, small sections or other shapes. At least one of conveyor rollers positioned perpendicularly to the vertical plane in which a saw is positioned is angularly displaceable in a horizontal plane relative to the vertical plane of the saw in the direction of travel of the lumber to maintain the lumber in close contact with a ruler member to obtain a straight cut. In addition to those conveyor rollers, a pair of rollers are provided above the horizontal plane of the conveyor rollers and adapted to be brought into frictional contact with the lumber placed on the conveyor rollers. One of those upper rollers is angularly displaceable relative to the vertical plane of the saw to the same extent and in the same direction as the angularly displaceable lower conveyor roller, while the other upper roller is kept perpendicular to the plane of the saw. According to one embodiment of the invention, the upper rollers are adapted to be positively driven, while the lower conveyor rollers are of the nature which are caused to rotate by the frictional contact with the lumber placed thereon. According to another embodiment, the lower conveyor rollers are adapted to be positively driven to transport the lumber placed thereon. In the latter embodiment, none of the upper rollers are necessary.

13 Claims, 10 Drawing Figures

AUTOMATIC LUMBERING APPARATUS

This invention relates to an automatic lumbering apparatus for sawing lumber into columns, boards, small sections or other shapes.

When lumber is sawn into columns, boards, small sections or other shapes by a band or circular sawing table at a lumber mill, it is common practice to cut the lumber along a plurality of parallel lines along each of which the lumber is advanced during the operation of the saw. Cutting the lumber along the first of those lines serves to separate the lumber into a useless portion covered with bark and the remaining portion of the lumber from which a number of useful products may be obtained. The edge of the lumber obtained by cutting it along the first line must be straight enough to be brought into close contact along its entire length with an adjacent surface of a ruler member on the machine in a subsequent sawing operation to obtain a first useful product from the lumber. It, however, requires considerable skill to obtain a straight edge by cutting lumber along the first line because the bark-covered edge of the lumber usually has a variety of uneven contours which do not permit reliance upon the ruler member, but require careful manual advancement of the lumber relative to the saw to obtain a sufficiently straight edge for the subsequent sawing operation to maximize production of acceptable products from a single plank of lumber.

In the subsequent operation for sawing a first useful product from the lumber, the second line along which the lumber is to be cut is determined by setting the distance between the ruler member and the saw in conformity with the desired width of the product. The lumber is brought into close contact with the ruler member along the edge obtained by the first cutting operation, and while the lumber edge is maintained in close contact with the ruler member, the lumber is advanced relative to the saw which in turn cuts the lumber to produce the first useful product of the desired width.

It has, however, been found that lumbering operations with known sawing table machines require a considerable amount of skill and experience. An unskilled or inexperienced operator often fails to accomplish a straight cut when removing a bark-covered edge from lumber. Moreover, he often fails to cut the lumber along straight lines in the subsequent operation, too, because the known machines make it difficult to advance the lumber in close contact with the ruler member throughout the operation, resulting in unreasonable occurrences of many useless products having an uneven width.

It is, therefore, an object of this invention to eliminate all the above described drawbacks of the known sawing machines. More particularly, it is an object of this invention to provide an improved lumbering apparatus having angularly adjustable conveyor rollers for lumber capable of maintaining the lumber in close contact with a ruler member throughout the sawing operation. According to this invention, the axes of conveyor rollers for the lumber to be sawn may be placed in a position perpendicular to the plane in which the saw lies (hereinafter called . e "saw plane") to allow the lumber to advance on the rollers in a fixed angular positional relationship to the saw plane, so that a straight cut may be obtained without the aid of a ruler member. One bark-co ered edge portion of the lumber can thus be removed leaving a straightly cut edge on the remaining portion of the lumber which is exactly complementary to the surface of the ruler member. The lumber may then be brought into close contact with the ruler member for the subsequent sawing operation, and in order to maintain the lumber in close contact with the ruler member throughout the sawing operation, some of the conveyor rollers may be angularly displaced relative to the saw plane in a direction of travel of the lumber, so that the lumber may continue to be pressed against the ruler member and a product having an accurate desired width along its length may be obtained. According to this invention some of the conveyor rollers for the lumber are angularly adjustable relative to the saw plane at a certain angle preferably in the range between 2° and 4°, while the other rollers may be kept perpendicular to the saw plane throughout the sawing operation. While the angularly adjustable rollers are switched over from their perpendicular position to their angular position after removal of a bark-covered edge portion from the lumber, it is alternatively possible to fix them in their angular position relative to the ruler member if the initial sawing operation for the removal of the barkcovered edge portion from the lumber is arranged to be effected on a separate sawing machine. Thus, this invention provides an improved lumbering apparatus which does not require any special skill or experience in the lumbering operation, but makes the lumbering operation simpler, less time consuming and less expensive.

Other objects and advantages of this invention will become apparent from the following description and the accompanying drawings, in which.

Figure 2:
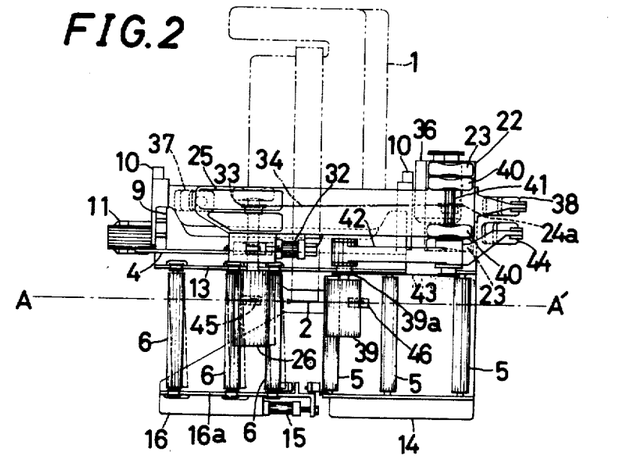
FIG. 2 is a top plan view of a first preferred embodiment of this invention.
Figure 3:
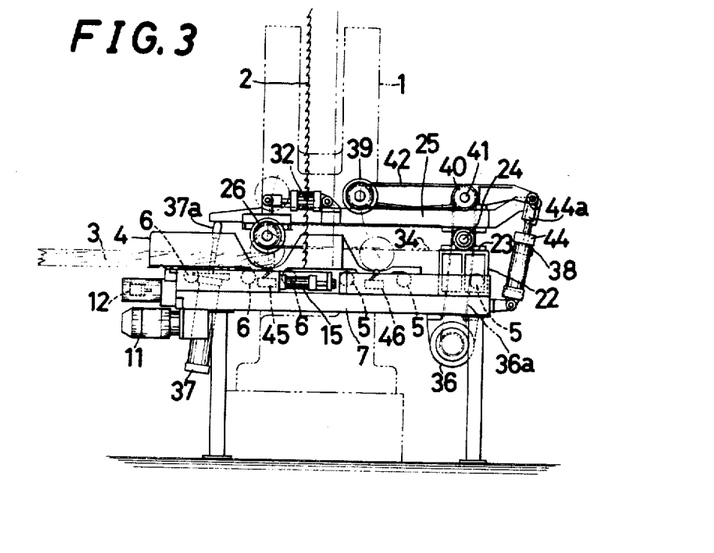
FIG. 3 is a front elevational view of the apparatus shown in FIG. 2.

Referring to the drawings, particularly FIGS. 2 and 3, there is shown a first preferred embodiment of this invention in the form of a band sawing machine provided with a main frame 1 and a band saw 2 in a known manner. The apparatus, according to the first preferred embodiment of this invention, includes a mounting bed 7 horizontally supported on the main frame 1 and a main bed 8 (FIG. 6) mounted on the mounting bed 7. The main bed 8 is provided on its top with a pair of guide grooves (not shown) extending in a direction perpendicular to the saw plane or the vertical plane in which the band saw 2 lies. A laterally movable ruler device 9 having a ruler member 4 is mounted on the main bed 8. The ruler device 9 has a pair of legs downwardly projecting from the opposite ends thereof, and each of these legs is slidably positioned in one of the grooves of the main bed 8 to allow the lateral movement of the ruler device 9 to and away from the saw 2 depending upon the desired width of the product to be sawn from the lumber. An electric motor 11 is mounted on the mounting bed 7 in a position adjacent to one end of the ruler device 9 and operationally associated with the ruler device 9 through a rack 10 and gearing means (not shown) to drive the ruler device 9. A detector 12 is provided on one end of the shaft of a pinion engaging with the rack 10 for detecting the position of the ruler device 9 during the lateral movement thereof and causing the ruler device 9 to stop at a position in which the distance between the ruler device 9 and the saw 2 is equal to the desired width of the product.

Figure 6:
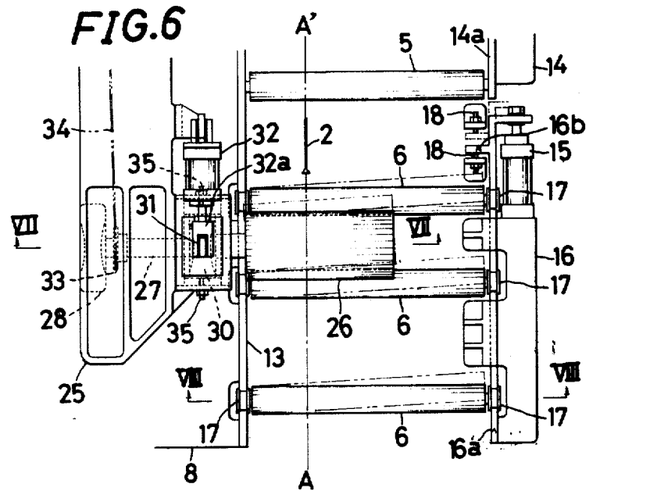
FIG. 6 is a fragmentary enlarged view of the apparatus shown in FIG. 2.

Two auxiliary beds 14 and 16 are provided in a horizontally spaced relationship with the main bed 8 and aligned with each other in a parallel relationship to the main bed 8. A plurality of angularly adjustable conveyor rollers 6 are mounted in a horizontal plane perpendicular to the saw plane and extend between the main bed 8 and the auxiliary bed 16. As best shown in FIG. 6, a bearing plate 13 is secured to the inner end of the main bed 8 and provided with a plurality of U-shaped cuts along the upper edge thereof. A slidable bearing plate 16a is provided on the inner end of the auxiliary bed 16 and formed with a plurality of U-shaped cuts along the upper edge thereof. A fluid cylinder 15 is mounted on the auxiliary bed 16 in a position between the auxiliary beds 14 and 16. The outer end of a piston rod extending from the cylinder 15 is connected to an adjacent end of the slidable bearing plate 16a to cause displacement of the bearing plate 16a relative to the auxiliary bed 16 within a predetermined distance upon actuation of the piston rod. A pair of stoppers 18 are provided on the mounting bed 7 in a position adjacent to one end of the slidable bearing plate 16a and spaced from each other to define the amount of the angular displacement of the conveyor rollers 6. A projection 16b is formed on the one end of the slidable bearing plate 16a and extends into the space between the stoppers 18. The projection 16b is adapted to abut against one of the stoppers 18 with the movement of the slidable bearing plate 16a upon actuation of the cylinder 15 to thereby position the conveyor rollers 6 either in their normal position perpendicular to the saw plane or in their angularly displaced position.

Figure 8:
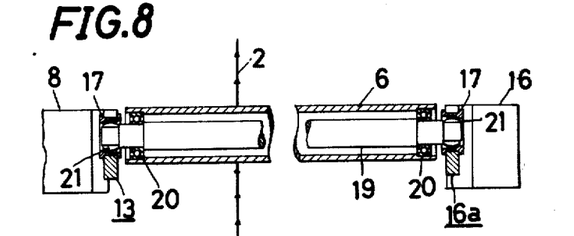
FIG. 8 is an enlarged vertical sectional view taken along the line VIII—VIII of FIG. 6.

Referring to FIG. 8, each of the conveyor rollers 6 is rotatably supported at each end of a shaft 19 by ball bearings 20 and each end of the shaft 19 is supported by a spherical bearing 21 in a flanged bearing housing 17 to allow angular displacement of the shaft 19 to cause the angular displacement of the conveyor roller 6. The bearing housing 17 is formed with a pair of annular flanges spaced from each other a distance slightly greater than the thickness of the bearing plates 13 and 16a and removably fitted in one of the U-shaped cuts of the bearing plates 13 and 16a to support the conveyor roller 6 on the bearing plates 13 and 16a.

Figure 7:
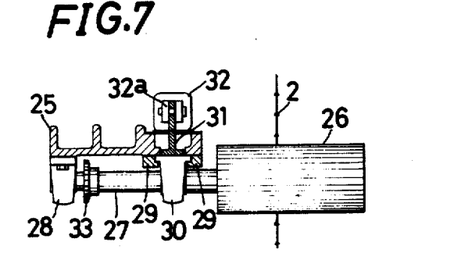
FIG. 7 is a fragmentary vertical sectional view taken along the line VII—VII of FIG. 6.

Referring to FIGS. 2 and 3, a shaft support member 22 is mounted on the mounting bed 7, and a bearing member 23 is attached to the shaft support member 22. A shaft 24 is rotatably supported on the bearing member 23 and an arm member 25 is supported on the shaft 24 by bearings. As shown in FIGS. 6 and 7, a bearing unit 28 is mounted on the underside of the arm member 25 in the vicinity of that end of the arm member 25 which is farther from the shaft 24. A shaft 27 is rotatably supported on the bearing unit 28 at one end, and the other end of the shaft 27 is connected to an angularly adjustable presser roller 26 disposed above the conveyor rollers 6 and adapted to rest on the lumber being transported on the conveyor rollers 6. The presser roller 26 and the shaft 27 therefor extend in parallel relation to the conveyor rollers 6. A guide member 29 is attached to the underside of the arm member 25 and a bearing unit 30 is slidably carried by the guide member 29, as shown in FIG. 7. The shaft 27 for the presser roller 26 extends through the bearing unit 30 and is rotatably supported thereby intermediate to the ends of the shaft 27. An arm member 31 is secured to the bearing unit 30 at one end, and the other end of the arm member 31 is secured to one end of a piston rod 32a connected with a fluid cylinder 32 at the other end. A sprocket wheel 24a is secured to the shaft 24 on which the arm member 25 is pivotally supported, as shown in FIG. 2. A sprocket wheel 33 is secured to the shaft 27 for the presser roller 26 intermediate to the ends thereof, and a roller chain 34 spans between the two sprocket wheels 24a and 33 as shown in FIG. 2. A pair of stopper bolts 35 are attached to the arm member 25 as shown in FIG. 6, and spaced from each other to define the spacing within which the arm member 31 secured to the piston rod 32a may be moved upon actuation of the cylinder 32 to move the bearing unit 30 relative to the guide member 29 to move the presser roller 26 between the first position in which its axis is perpendicular to the saw plane A-A' as shown by solid lines in FIG. 6 and its second position in which its axis is angularly displaced relative to the saw plane A-A' in the direction of travel of the lumber to be sawn as shown by phantom lines in FIG. 6.

An electric motor 36 is mounted on the underside of the mounting bed 7 and a roller chain 36a extends between the motor 36 and the shaft 24 as shown in FIG. 3 to transmit rotation of the motor 36 to the roller chain 34 to drive the presser roller 26 positively. A fluid cylinder 37 having a piston rod 37a is mounted on the main bed 8, and the free end of the piston rod 37a is adapted to abut against the underside of the free end of the arm member 25 to raise and lower the arm member 25 upon actuation of the cylinder 37 to raise and lower the presser roller 26. A fluid cylinder 38 is mounted on the mounting bed 7 in a position opposite to the cylinder 37 and has a piston rod connected to the opposite end of the arm member 25, as shown in FIG. 3. The cylinder 38 is adapted to press the presser roller 26 against the lumber during the sawing operation, and the pressure of the fluid being supplied to the cylinder 38 may be adequately controlled to adjust the pressure exerted on the lumber as well as to prevent the presser roller 26 from falling suddenly off the trailing edge of the lumber upon movement of the lumber past the pressure roller 26.

A presser roller 39 is positioned on the opposite side of the band saw 2 from the first mentioned presser roller 26 and adapted to be pressed against the lumber and cooperate with the conveyor rollers 5 positioned on the opposite side of the band saw 2 from the angularly displaceable conveyor rollers 6 to transport the lumber after it has been cut by the saw 2. A pair of bearing members 40 are secured to the upper side of the arm member 25 in a position above the shaft 24 on which the arm member 25 is pivotally supported. A shaft 41 is rotatably supported on the bearing members 40 and extends across the arm member 25 in parallel relation to the shaft 24 as can be seen in FIG. 3. An arm member 42 is vertically movably supported on the shaft 41 and the presser roller 39 is rotatably supported on one end of the arm member 42 as shown in FIGS. 2 and 3. A sprocket wheel 39a is secured to the shaft of the presser roller 39 as shown in FIG. 2, and a roller chain 43 extends between the sprocket wheel 39 a and a sprocket wheel on the shaft 41. Another roller chain extends between another sprocket wheel on the shaft 24 and another sprocket wheel on the shaft 41 and is adapted to transmit rotation of the shaft 24 to the presser roller 39 through the shaft 41 and the roller chain 43 to positively rotate the presser roller 39 simultaneously with the angularly displaceable presser roller 26 upon rotation of the motor 36. A fluid cylinder 44 having a piston rod 44a is mounted on the mounting bed 7 in substantially parallel relation to the fluid cylinder 38 for the arm member 25. The upper end of the piston rod 44a is connected to the other end of the arm member 42 to rotate the arm member 42 upon actuation of the cylinder 44 to raise or lower the presser roller 39.

Figure 10:
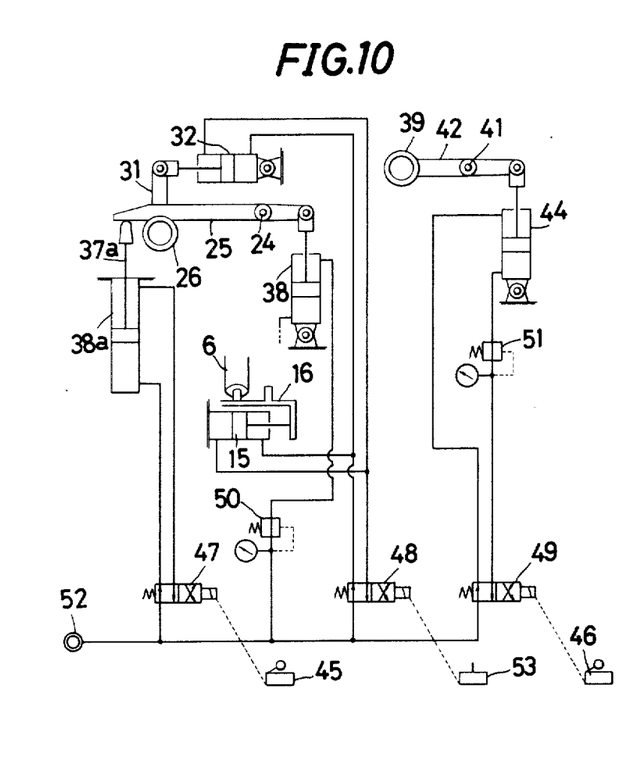
FIG. 10 is a diagram illustrating a typical arrangement of the fluid circuitry for the apparatus shown in FIGS. 2 and 3.

A pair of limit switches 45 and 46 are installed on the main bed 8 substantially in the saw plane A-A' below the two presser rollers 26 and 39, respectively. The limit switches 45 and 46 are positioned substantially in the horizontal plane of the conveyor rollers 6 and 5 in such a manner that they may be contacted by the lumber 3 during its travel on the rollers 6 and 5. Referring to FIG. 10, a solenoid valve 47 is provided on a fluid line between the cylinder 37 and a source of fluid 52. The limit switch 45 is adapted to transmit an elelctric signal to the solenoid valve 47 to actuate it. A second solenoid valve 48 is provided on a fluid line from the fluid source 52 to the cylinders 15 and 32 and adapted to be actuated by a third switch 53. A third solenoid valve 49 is provided on a fluid line between the fluid source 52 and the cylinder 44, and the limit switch 46 is adapted to transmit an electric signal to the solenoid valve 49 to actuate it. A pressure reducing valve 50 is provided on a fluid line between the fluid source 52 and the cylinder 38. A second pressure reducing valve 51 is provided on a fluid line between the cylinder 44 and the solenoid valve 49.

Referring the operation of the apparatus according to the first preferred embodiment of this invention as hereinabove described, when the useless edge portion c (FIG. 1) is to be cut off from the lumber 3, all the three solenoid valves 47, 48 and 49 remain deenergized to position the cylinders 15 and 32 so as to maintain the axes of the angularly displaceable conveyor rollers 6 and the angularly displaceable presser roller 26 perpendicular to the saw plane A-A' and also to position the cylinders 37 and 44 so as to maintain the two presser rollers 26 and 39 in their raised positions. The pressure of the fluid to the cylinder 38 is regulated by the pressure reducing valve 50 so as to allow the arm member 25 to rotate about the shaft 24 clockwise upon elevation of the piston rod 37a of the cylinder 37, while counterclockwise overcoming the action of the cylinder 38 by its own weight upon descent of the piston rod 37a. The lumber 3 is then fed to the apparatus by being transported on the conveyor rollers 6. Upon being contacted by the leading edge of the lumber 3, the limit switch 45 transmits an electric signal to the solenoid valve 47 to reverse the fluid circuit connections in the solenoid valve 47 to lower the piston rod 37a. Upon lowering of the piston rod 37a, the angularly displaceable presser roller 26 carried on the arm member 25 and positively rotated by the motor 36 is lowered onto the lumber 3 to cooperate with the conveyor rollers 6 to transport the lumber 3. Insofar as the conveyor rollers 6 and the presser roller 26 are kept perpendicular to the saw plane A-A', the lumber 3 is allowed to travel in parallel relation to the saw plane A-A' and engage the teeth of the band saw 2 to be cut thereby. As the sawing operation further proceeds, the leading edge of the lumber 3 contacts the limit switch 46, and the limit switch 46 transmits an electric signal to the solenoid valve 49 to reverse the fluid circuit connections in the solenoid valve 49. Upon reversal of the solenoid valve 49, the piston rod 44a of the cylinder 44 is raised to lower the presser roller 39 which is positively rotated by the motor 36. The presser roller 39 is lowered onto the lumber 3 which has been cut by the saw 2, and cooperates with the conveyor rollers 5 to tranport the lumber 3 out of the apparatus. Thus, the lumber 3 can be properly transported by the conveyor rollers 6 and 5 and the presser rollers 26 and 39 during removal of the useless edge portion c, so that the straight edge required for the subsequent sawing operation can be easily obtained on the lumber 3 without relying upon the ruler member 4. It will be noted that the limit switches 45 and 46 remain actuated as long as they are contacted by the lumber 3, and they become deactuated upon movement of the lumber 3 past them, so that the presser rollers 26 and 39 are elevated upon completion of each cycle of sawing operation.

Figure 1:
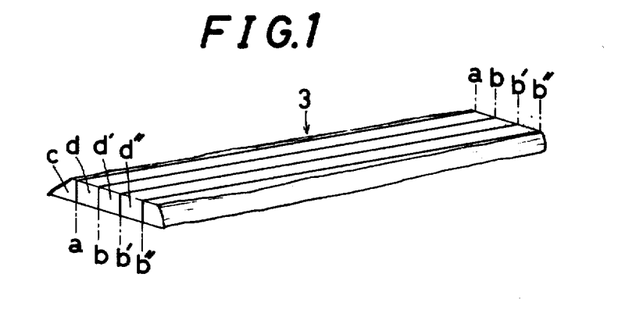
FIG. 1 is a perspective view of the lumber to be sawn by the apparatus of this invention.

The lumber 3 from which the useless edge portion c has been removed is now ready for the subsequent sawing operation along the lines $b—b$, $b'—b'$ and $b''—b''$ to obtain products $d$, $d'$ and $d''$ as illustrated in FIG. 1. The switch 53 is turned on to reverse the fluid circuit connections in the solenoid valve 48 to actuate the cylinders 15 and 32 to angularly displace the conveyor rollers 6 and the presser roller 26 relative to the saw plane A-A' as shown by the phantom lines in FIGS. 2 and 6. The ruler member 4 is laterally moved and positioned in accordance with the desired width of the products $d$, $d'$ and $d''$, and the lumber 3 is fed to the apparatus by having its straight edge $a—a$ (FIG. 1) pressed against the ruler member 4. The conveyor rollers 6 are angularly displaced relative to the saw plane A-A', i.e., the ruler member 4 in the direction of travel of the lumber 3, so that the lumber 3 being transported on the conveyor rollers 6 may be urged against the ruler member 4 and its edge $a—a$ may be kept in close contact with the ruler member 4 to ensure that straight cuts be obtained on the products $d$, $d'$ and $d''$. As the lumber 3 further travels, it contacts the limit switch 45, and the limit switch 45 actuates the solenoid valve 47 to lower the presser roller 26 which has been angularly displaced relative to the ruler member 4 in the direction of the travel of the lumber 3 to further ensure that the lumber 3 be maintained in close contact with the ruler member 4 throughout the sawing operation and that the products $d$, $d'$ and $d''$ have exactly the desired width. As the leading edge of the lumber 3 moves past the saw 2 and contacts the limit switch 46, the presser roller 39 is lowered onto the lumber 3 to provide additional support on the lumber 3 as it is further sawn and transported out of the apparatus.

It will thus be observed that the apparatus of this invention can to a considerable extent simplify the lumbering operation in both the removal of a bark-covered useless first edge portion from lumber and the subsequent cycles of sawing operation for production of desired products without necessitating any special skill or experience on the part of the operator.

It will be noted that the pressures exerted on the lumber 3 by the presser rollers 26 and 39 may be adjusted by regulating the pressures of the fluid to the cylinders 38 and 44 by the pressure reducing valves 50 and 51, respectively.

Figure 4:
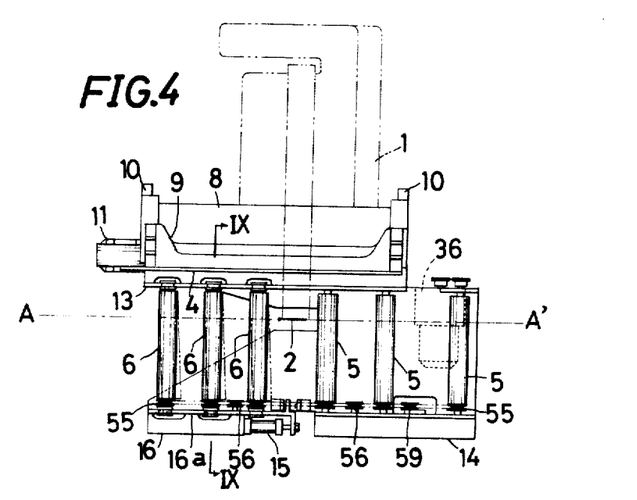
FIG. 4 is a top plan view of a second preferred embodiment of this invention.
Figure 5:
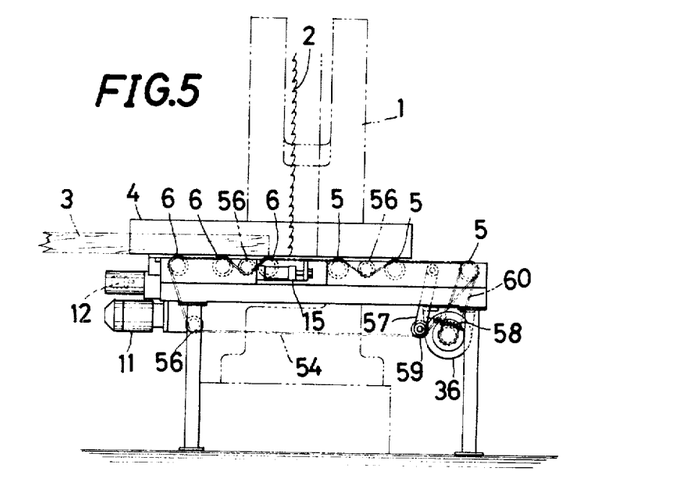
FIG. 5 is a front elevational view of the apparatus shown in FIG. 4.
Figure 9:
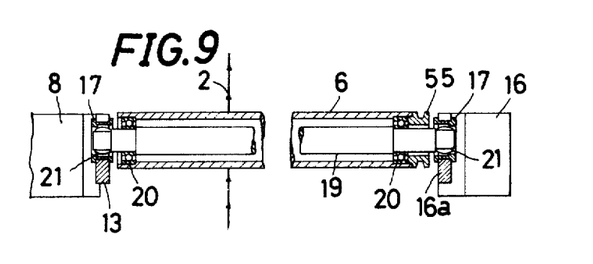
FIG. 9 is an enlarged vertical sectional view taken along the line IX—IX of FIG. 4.

FIGS. 4, 5 and 9 show a second preferred embodiment of this invention. The principal difference between this particular embodiment and the first described embodiment is the omission of the presser rollers 26 and 39 and their associated equipment. A further difference exists in the mechanism for driving the conveyor rollers 6 and 5. As shown in FIGS. 4 and 9, a V-pulley 55 is formed on one end of each of the conveyor rollers 5 and 6, and a plurality of intermediate pulleys 56 and a tension pulley 59 carried on a tension arm 57 are provided as shown in FIG. 5. An endless V-belt 54 is passed around the V-pulleys 55 on the rollers 5 and 6, the intermediate V-pulleys 56 and the tension pulley 59 as illustrated in FIG. 5. A roller chain 60 is passed around the shaft of the motor 36 and the conveyor roller 5 closest to the exit of the apparatus to transmit rotation of the motor 36 to the roller 5 to cause the roller 5 to rotate. The rotation of the roller 5 is transmitted via the V-pulley 55 to the V-belt 54 to rotate the other rollers 5 and 6. The ruler device, the mechanism for effecting the angular displacement of the rollers 6, and the like may duplicate those employed in the first embodiment of the invention as hereinbefore described. The operation of the apparatus according to the second preferred embodiment of the invention may be achieved substantially as described with reference to the first preferred embodiment. The omission of the presser rollers 26 and 39 may be advantageous in that there would be no restriction to the thickness of the lumber 3 to be sawn, while it may be disadvantageous in that the lumber 3 would have a tendency to fall during its travel on the conveyor rollers if it has a greater thickness than width. It should, however, be noted that the omission of the presser rollers 26 and 39 would not cause any appreciable tendency of the lumber 3 to slip laterally on the conveyor rollers 6 and 5 during the sawing operation, because the band saw 2 exerts a certain amount of pressure on the lumber 3 to maintain it in position while cutting it.

While in both of the foregoing two preferred embodiments of the invention the angularly displaceable conveyor rollers 6 have been described as being located ahead of the band saw 2, it is not always necessary to locate them as described, but it is entirely satisfactory to position the rollers 6 in any other location if they can maintain the lumber 3 in close contact with the ruler member 4 when angularly displaced relative thereto. It will be further noted that if any apparatus according to this invention is intended for use for the sole purpose of cutting lumber from which a bark-covered useless first edge portion is removed by a separate machine, the conveyor rollers 6 may be fixed in their angularly displaced position.

It will readily be understood from the foregoing description of the invention in two preferred forms that this invention provides an improved lumbering apparatus which can effectively be used with a band or circular sawing machine to permit any inexperienced operator to accomplish the lumbering operation which has hitherto required a high level of manual skill and experience, and accordingly, that the apparatus of this invention largely contributes to automating, simplifying and labor saving of the lumbering operation.

What is claimed is:

1. In an automatic lumbering apparatus including a main frame, a saw mounted in a vertical plane, a main bed mounted on said main frame, a ruler device having a ruler member mounted on said main bed and laterally movable to and away from said saw, a bearing plate mounted on said main bed, an auxiliary bed mounted on said main frame and laterally spaced from said main bed, a bearing plate mounted on said auxiliary bed in parallel relation to said bearing plate on said main bed, and a plurality of conveyor rollers rotatably mounted in a horizontal plane and adapted to transport thereon the lumber to be sawn, said conveyor rollers being parallel to each other and perpendicular to said vertical plane of said saw, each of said conveyor rollers being supported on said bearing plate on said main bed at one end and on said bearing plate on said auxiliary bed at the other end, an improvement comprising at least one of said conveyor rollers which is located closely opposite to said ruler member and is angularly displaceable relative to said vertical plane of said saw in the direction of travel of said lumber, means for angularly displacing said angularly displaceable conveyor roller, and means for rotating said conveyor rollers simultaneously.

2. The apparatus as defined in claim 1 wherein said bearing plate on said auxiliary bed is slidable along the length of said auxiliary bed.

3. The apparatus as defined in claim 2 wherein said means for angularly displacing said angularly displaceable conveyor roller comprises a fluid cylinder having a piston rod connected to said slidable bearing plate on said auxiliary bed.

4. The apparatus as defined in claim 1 wherein said means for rotating said conveyor rollers comprises an electric motor having an output shaft, a roller chain passed around said electric motor output shaft and one of said conveyor rollers, a pulley provided on each of said conveyor rollers, and a belt passed around said pulleys.

5. In an automatic lumbering apparatus including a main frame, a saw mounted in a vertical plane, a main bed mounted on said main frame, a ruler device having a ruler member mounted on said main bed and laterally movable to and away from said saw, a bearing plate mounted on said main bed, an auxiliary bed mounted on said main frame and laterally spaced from said main bed, a bearing plate mounted on said auxiliary bed in parallel relation to said bearing plate on said main bed, and a plurality of conveyor rollers rotatable mounted in a horizontal plane and adapted to transport thereon the lumber to be sawn, said conveyor rollers being parallel to each other and perpendicular to said vertical plane of said saw, each of said conveyor rollers being supported on said bearing plate on said main bed at one end and on said bearing plate on said auxiliary bed at the other end, an improvement comprising at least one of said conveyor rollers which is located closely opposite to said ruler member and is angularly displaceable relative to said vertical plane of said saw in the direction of travel of said lumber, a first presser roller rotatably and vertically movably supported on said main bed, said first presser roller being spaced above said angularly displaceable conveyor roller and angularly displaceable at the same angle and in the same direction as said angularly displaceable conveyor roller, means for moving said first presser roller vertically, a second presser roller rotatably and vertically movably supported on said main bed, said second presser roller being spaced above said conveyor rollers other than said angularly displaceable conveyor roller in parallel relation thereto and to said first presser roller, means for moving said second presser roller vertically, means for angularly displacing said angularly displaceable conveyor roller and said first presser roller at the same angle simultaneously, means for rotating said first presser roller, and means for rotating said second presser roller.

6. The apparatus as defined in claim 5 wherein said first presser roller has a shaft projecting from one end thereof, and including an arm member vertically tiltably supported on said main bed and extending in parallel relation to said vertical plane of said saw, and two spaced bearing units mounted on one end of said arm member to rotatably support said shaft of said first presser roller, one of said bearing units being secured to said arm member and the other of said bearing units being carried by said arm member slidably along the length of said arm member.

7. The apparatus as defined in claim 6 wherein said means for angularly displacing said angularly displaceable conveyor roller and said first presser roller at the same angle simultaneously comprises said bearing plate on said auxiliary bed slidably supported on said auxiliary bed, a first fluid cylinder mounted on said auxiliary bed and having a piston rod connected to one end of said bearing plate on said auxiliary bed, and a second fluid cylinder mounted on said arm member and having a piston rod connected to said slidable bearing unit, and a common solenoid valve through which first and second fluid cylinders are connected to a source of fluid.

8. The apparatus as defined in claim 6 wherein said means for moving said first presser roller vertically comprises said arm member, means for supporting said arm member rotatably in a vertical plane intermediate to the ends thereof, the distance between said one end of said arm member and said supporting means being greater than the distance between said supporting means and the other end of said arm member, a first fluid cylinder vertically mounted on said main bed and having a piston rod adapted to support said one end of said arm member thereon, and a second fluid cylinder mounted on said main bed and having a piston rod connected to said other end of said arm member, said second fluid cylinder being adapted to be supplied with a lower fluid pressure than said first fluid cylinder, whereby upon elevation of said piston rod of said first fluid cylinder said one end of said arm member is raised to raise said first presser roller, while upon descent of said piston rod of said first fluid cylinder said one end of said arm member is lowered by its own weight by overcoming the action of said second fluid cylinder to lower said first presser roller.

9. The apparatus as defined in claim 6 wherein said means for moving said second presser roller vertically comprises a second arm member supported on said first mentioned arm member rotatably in a vertical plane, said second arm member having one end terminating inwardly of said one end of said first mentioned arm member, and a fluid cylinder vertically mounted on said main bed and having a piston rod connected to the other end of said second arm member.

10. The apparatus as defined in claim 8, further including a limit switch adapted to maintain said piston rod of said first fluid cylinder in such a position as to allow said first presser roller to remain resting on the lumber to be sawn.

11. The apparatus as defined in claim 9, further including a limit switch adapted to maintain said piston rod of said fluid cylinder in such a position as to allow said second presser roller to remain resting on the lumber to be sawn.

12. The apparatus as defined in claim 6 wherein said means for rotating said first presser roller comprises a sprocket wheel secured to said shaft of said first presser roller, a shaft rotatably supported by said arm member, a pair of sprocket wheels secured to said arm member shaft, an electric motor mounted on a mounting bed and having an output shaft, a sprocket wheel secured to said motor output shaft, a roller chain passed around said sprocket wheel on said first presser roller shaft and one of said sprocket wheels on said arm member shaft, and a roller chain passed around the other of said sprocket wheels on said arm member shaft and said sprocket wheel on said motor output shaft.

13. The apparatus as defined in claim 12 wherein said means for rotating said second presser roller comprises a third sprocket wheel secured to said arm member shaft, a second shaft rotatably supported on said arm member, a pair of sprocket wheels secured to said second arm member shaft, a shaft projecting from one end of said second presser roller, a sprocket wheel secured to said second presser roller shaft, a roller chain passed around said third sprocket wheel on said arm member shaft and one of said sprocket wheels on said second arm member shaft, and a roller chain passed around the other of said sprocket wheels on said second arm member shaft and said sprocket wheel on said second presser roller shaft, whereby said second presser roller is adapted to be rotated simultaneously with said first presser roller upon rotation of said electric motor.

* * * * *